United States Patent
Carvajal et al.

(10) Patent No.: US 10,351,730 B2
(45) Date of Patent: Jul. 16, 2019

(54) BLENDED RELEASE MATERIALS

(71) Applicant: 3M INNOVATIVE PROPERTIES COMPANY, St. Paul, MN (US)

(72) Inventors: Daniel Carvajal, Edina, MN (US); Larry D. Boardman, Woodbury, MN (US); David J. Kinning, Woodbury, MN (US); Michael D. Determan, Mahtomedi, MN (US); Kiu-Yuen Tse, Woodbury, MN (US); Maria A. Appeaning, St. Paul, MN (US)

(73) Assignee: 3M Innovation Properties Company, St. Paul, MN (US)

( * ) Notice: Subject to any disclaimer, the term of this patent is extended or adjusted under 35 U.S.C. 154(b) by 98 days.

(21) Appl. No.: 15/100,688

(22) PCT Filed: Dec. 16, 2014

(86) PCT No.: PCT/US2014/070564
§ 371 (c)(1),
(2) Date: Jun. 1, 2016

(87) PCT Pub. No.: WO2015/095173
PCT Pub. Date: Jun. 25, 2015

(65) Prior Publication Data
US 2016/0297999 A1    Oct. 13, 2016

Related U.S. Application Data (60) Provisional application No. 61/916,466, filed on Dec. 16, 2013.

(51) Int. Cl.
*C08K 5/56* (2006.01)
*C09J 7/38* (2018.01)
(Continued)

(52) U.S. Cl.
CPC .......... *C09D 183/04* (2013.01); *C08G 77/06* (2013.01); *C08G 77/20* (2013.01); *C08G 77/24* (2013.01);
(Continued)

(58) Field of Classification Search
CPC ............. C09J 7/0228; C09J 7/401; C09J 7/38
See application file for complete search history.

(56) References Cited

U.S. PATENT DOCUMENTS

| 4,260,698 A | 4/1981 | Tatemoto |
| 4,732,931 A | 3/1988 | Maxson |

(Continued)

FOREIGN PATENT DOCUMENTS

| CN | 101932638 | 12/2010 |
| CN | 102471582 | 5/2012 |

(Continued)

OTHER PUBLICATIONS

Brook, Michael, "Crosslinking of Silicones," Silicon in Organic, Organometallic, and Polymer Chemistry, pp. 282-283, 2000.

(Continued)

*Primary Examiner* — Victor S Chang
(74) *Attorney, Agent, or Firm* — Adrian L. Pishko; Thomas M. Spielbauer (57) ABSTRACT

Blended, release materials containing crosslinked silicones, crosslinked fluorosilicones, and nonfunctional fluorosilicones are described. Articles including release liners and adhesive articles are also described, as are methods of making such blended release materials and articles incorporating them.

14 Claims, 1 Drawing Sheet

(51) Int. Cl.
    *C09J 7/40*     (2018.01)
    *C08G 77/06*    (2006.01)
    *C08G 77/12*    (2006.01)
    *C08G 77/20*    (2006.01)
    *C08G 77/24*    (2006.01)
    *C08L 83/00*    (2006.01)
    *C08L 83/04*    (2006.01)
    *C08L 83/08*    (2006.01)
    *C09D 183/04*   (2006.01)
    *C09D 183/08*   (2006.01)
    *C09J 183/04*   (2006.01)

(52) U.S. Cl.
    CPC .............. *C08L 83/04* (2013.01); *C08L 83/08* (2013.01); *C09D 183/08* (2013.01); *C09J 7/38* (2018.01); *C09J 7/401* (2018.01); *C08G 77/12* (2013.01); *C08L 2205/025* (2013.01); *C08L 2205/03* (2013.01); *C09J 183/04* (2013.01); *C09J 2201/606* (2013.01); *C09J 2427/00* (2013.01); *C09J 2483/00* (2013.01); *C09J 2483/005* (2013.01); *C09J 2483/006* (2013.01)

(56) References Cited

U.S. PATENT DOCUMENTS

| | | | |
|---|---|---|---|
| 5,082,706 A | 1/1992 | Tangney | |
| 5,302,632 A | 4/1994 | Maxson | |
| 5,356,719 A * | 10/1994 | Hamada | C08L 83/08 428/447 |
| 5,447,987 A | 9/1995 | Sato | |
| 5,578,381 A | 11/1996 | Hamada | |
| 7,078,093 B2 | 7/2006 | Sheridan | |
| 8,541,181 B2 | 9/2013 | Bresnick | |
| 8,541,481 B2 | 9/2013 | Determan | |
| 9,371,428 B2 | 6/2016 | Frances et al. | |
| 2005/0038217 A1 | 2/2005 | Ahn | |
| 2011/0244226 A1 | 10/2011 | Seth | |
| 2012/0219794 A1 | 8/2012 | Seth | |

FOREIGN PATENT DOCUMENTS

| | | |
|---|---|---|
| EP | 0488709 | 3/1997 |
| EP | 0608780 | 9/1997 |
| IT | 1125443 | 5/1986 |
| JP | 63-108066 | 5/1988 |
| JP | 7228781 | 8/1995 |
| TW | 102898653 | 1/2013 |
| WO | WO 00/61693 | 10/2000 |
| WO | WO 2004-108822 | 12/2004 |
| WO | WO 2005-059028 | 6/2005 |
| WO | WO 2011/011654 | 1/2011 |
| WO | WO 2011-059462 | 5/2011 |
| WO | WO 2011-082069 | 7/2011 |
| WO | WO 2014-193654 | 12/2014 |

OTHER PUBLICATIONS

International Search Report for PCT International Application No. PCT/US2014/070564 dated Mar. 16, 2015, 3 pages.

* cited by examiner

BLENDED RELEASE MATERIALS

CROSS REFERENCE TO RELATED APPLICATIONS

This application is a national stage filing under 35 U.S.C. 371 of PCT/US2014/070564, filed Dec. 16, 2014, which claims the benefit of U.S. Application No. 61/916,466, filed Dec. 16, 2013, the disclosure of which is incorporated by reference in its/their entirety herein.

FIELD

The present disclosure relates to high performance, blended, release materials. Specifically, release materials containing crosslinked silicones, crosslinked fluorosilicones, and nonfunctional fluorosilicones are described. Articles including release liners and adhesive articles are also described. The present disclosure also relates to methods of making such blended release materials and articles incorporating them.

SUMMARY

Briefly, in one aspect, the present disclosure provides a composition comprising a blend of: (a) a functional, non-fluorinated, silicone polymer; (b) a functional fluorosilicone polymer; and (c) a nonfunctional fluorosilicone polymer.

In some embodiments, the blend comprises at least 50 weight percent of the functional, non-fluorinated, silicone polymer based on the total weight of (a) and (b), e.g., in some embodiments, the blend comprises 65-97, e.g., 80 to 95 weight percent, inclusive, of the functional, non-fluorinated, silicone polymer based on the total weight of (a) and (b). In some embodiments, the blend comprises at least 3, e.g., at least 5 weight percent of the functional fluorosilicone polymer based on the total weight of (a) and (b). For example, the blend often comprises 3 to 35 weight percent, such as 4 to 30 weight percent, 5 to 20 weight percent, or 8 to 15 weight percent of the functional fluorosilicone polymer based on the total weight of (a) and (b). In some embodiments, the blend comprises at least 1 part by weight of the nonfunctional fluorosilicone polymer per 100 parts by weight of (a) and (b). In some embodiments, the blend comprises no greater than 30, e.g., no greater than 15 parts by weight of the nonfunctional fluorosilicone polymer per 100 parts by weight of (a) and (b).

In some embodiments, the functional, non-fluorinated, silicone polymer comprises at least two ethylenically-unsaturated organic groups. In some embodiments, the functional, non-fluorinated, silicone polymer has a vinyl equivalent weight of 500 to 5000 grams per equivalent.

In some embodiments, the functional fluorosilicone polymer comprises at least two ethylenically-unsaturated organic groups. In some embodiments, the functional fluorosilicone polymer has a vinyl equivalent weight of 500 to 40,000 grams per equivalent, for example 1,000 to 20,000, e.g. 1,500 to 10,000 grams per equivalent. In some embodiments, the ratio of the vinyl equivalent weight of the functional fluorosilicone polymer over the vinyl equivalent weight of the functional non-fluorinated silicone polymer is at least 1, e.g., in some embodiments, the ratio of the vinyl equivalent weight of the functional fluorosilicone polymer over the vinyl equivalent weight of the functional non-fluorinated silicone polymer is at least between 2 and 6, inclusive.

In some embodiments, the nonfunctional fluorosilicone polymer comprises fluorinated groups comprising two or more fluorinated carbon atoms, e.g., in some embodiments, the fluorinated groups of the nonfunctional fluorosilicone polymer comprise nonafluorohexyl groups i.e., $-CH_2CH_2-C_4F_9$.

In some embodiments, the functional fluorosilicone polymer comprises fluorinated groups comprising two or more fluorinated carbon atoms, e.g., in some embodiments, the fluorinated groups of the functional fluorosilicone polymer comprise nonafluorohexyl groups, i.e., $-CH_2CH_2-C_4F_9$.

In some embodiments, the composition further comprises at least one of a silicone crosslinker and a fluorosilicone crosslinker, e.g., at least one crosslinker comprising a silicon bonded hydride group.

In another aspect, the present disclosure provides a cured release material comprising the composition according to any of the embodiments described, wherein the functional, non-fluorinated, silicone polymer and the functional fluorosilicone polymer are crosslinked. In some embodiments, the crosslinked functional, non-fluorinated, silicone polymer comprises the reaction product of the functional, non-fluorinated, silicone polymer and a silicone crosslinker. In some the crosslinked functional fluorosilicone polymer comprises the reaction product of the functional fluorosilicone polymer and a fluorosilicone crosslinker.

In yet another aspect, the present disclosure provides a release liner comprising a substrate and the cured release material according to any of the embodiments bonded to at least a portion of at least one surface of the substrate.

In another aspect, the present disclosure provides an adhesive article comprising the release liner according to any of the embodiments and an adhesive in contact with at least a portion of at least one surface of the cured release material. In some embodiments, the adhesive is a silicone adhesive, e.g., an e-beam cured silicone adhesive, a silicone polyurea adhesive, or a polydiorganosiloxane-polyoxamide adhesive.

In another aspect, the present disclosure provides a method of forming a release article comprising: applying the composition according to any of the embodiments to at least a portion of at least one surface of a substrate, and crosslinking the functional, non-fluorinated, silicone polymer and the functional fluorosilicone polymer. In some embodiments, crosslinking the functional, non-fluorinated, silicone polymer comprises reacting the functional, non-fluorinated, silicone polymer with a silicone crosslinker. In some embodiments, crosslinking the functional fluorosilicone polymer comprises reacting the functional fluorosilicone polymer with a fluorosilicone crosslinker.

In another aspect, the present disclosure provides a method of forming an adhesive article comprising: applying an adhesive to the release material of any of the embodiments. In some embodiments, applying the adhesive comprises laminating a cured adhesive to the release material. In some embodiments, applying the adhesive comprises applying an uncured adhesive to the release material and curing the adhesive.

In a further aspect, the present disclosure provides a composition comprising a blend of: (a) at least 80 to no greater than 95 weight percent based on the total weight of (a) and (b) of a functional, non-fluorinated, silicone polymer comprising at least two ethylenically-unsaturated groups; (b) at least 5 to no greater than 20 weight percent, such as at least 8 and no greater than 15 weight percent, based on the total weight of (a) and (b) of a functional fluorosilicone polymer comprising at least two ethylenically-unsaturated groups; and (c) at least 1 to no greater than 15 parts by weight of a nonfunctional fluorosilicone polymer based on 100 parts by weight of (a) and (b).

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available. Silicone PSAs offer one or more of the following useful characteristics: adherence to low surface energy (LSE) surfaces, performance at high and low temperature extremes, weathering resistance (including resistance to ultraviolet (UV) radiation, oxidation, and humidity), chemical resistance (e.g., solvents and plasticizers), and resistance to biological substances (e.g., mold and fungi).

Unfortunately, finding suitable, yet cost-effective, release materials has proven to be one of the major issues inhibiting the widespread adoption of silicone pressure sensitive adhesives. For example, few release materials provide stable, consistent, smooth release of a wet-cast silicone adhesive. Since the adhesives themselves are silicone based, traditional release liners based on polydimethylsiloxane (PDMS) chemistries are generally ineffective. For example, silicone adhesives such as e-beam cured silicone adhesives (such as those described in U.S. Pat. No. 8,541,181 (Bresnick)), silicone polyurea adhesives (such as those described in U.S. Pat. No. 7,078,093 (Sheridan)), and polydiorganosiloxane-polyoxamide adhesives (such as those described in WO 2011/082069 (Hays)), offer challenges in terms of obtaining stable, consistent, smooth and cost-effective release.

Fluorinated release coatings have been used; however, the selection is limited. The most common fluorinated release coatings are fluorosilicone materials, i.e., silicone materials comprising at least some fluorine atoms. However, commercially available fluorosilicone release coatings are typically more expensive than many common fluorinated materials as well as silicone release materials.

Several approaches have been tried to provide cost-effective, fluorosilicone-based release materials for use with silicone PSAs. For example, U.S. Publication No. 2012-0219794-A1 ("Fluorosilicone Blend Release Materials") describes release materials containing blends of a functional fluorosiloxane polymer with a functional non-fluorinated siloxane polymer. Also, U.S. Publication No. 2011-0244226-A1 ("Blended Fluorosilicone Release Materials") describes release materials containing blends of a fluorosiloxane polymer with a linear fluoropolymer. While these materials are suitable for use with a range of silicone-based adhesives, there remains a need for more robust release compositions, particularly for use with more aggressive, difficult to release silicone-based PSAs.

Generally, the release materials of the present disclosure comprise a blend of a functional, non-fluorinated silicone polymer; a functional fluorosilicone polymer; and a nonfunctional fluorosilicone polymer. Suitable additives such as crosslinkers may also be present.

The term "vinyl equivalent weight" is used to describe various polymers herein. As used herein, the "vinyl equivalent weight" of a material, such as a polymer, refers to the quotient of the mass of the reference material in grams and the mols of ethylenically-unsaturated functional groups in the material. Thus, a polymer sample having a mass of 5,000 grams and 2 mols of ethylenically-unsaturated functional groups has a vinyl equivalent weight of 5,000 divided by 2, or 2,500 grams. Generally, as the vinyl equivalent weight of a polymer in a curable composition is increased, the crosslink density of the composition after curing will decrease.

The degree of polymerization of various polymers discussed herein is often selected to provide polymers having a desired vinyl equivalent weight. The vinyl equivalent weight of a polymer and the degree of polymerization of the polymer are related; however, the precise relationship between the two depends on the chemical identity of each monomer unit in the polymer, including the molecular weight of each polymerized monomer or co-monomer and the number of olefin units in each polymerized monomer or co-monomer. Thus, a person of skill in the art can readily provide a polymer having a desired vinyl equivalent weight by selecting appropriate monomers or co-monomers and appropriate degrees of polymerization.

Functional, Non-Fluorinated, Silicone Polymer. Generally, the functional, non-fluorinated, silicone polymer is an organopolysiloxane polymer comprising at least two crosslinkable reactive groups, e.g., two ethylenically-unsaturated organic groups. In some embodiments, the functional, non-fluorinated, silicone polymer comprises two terminal crosslinkable groups, e.g., two terminal ethylenically-unsaturated groups. In some embodiments, the functional, non-fluorinated, silicone polymer comprises pendant functional groups, e.g., pendant ethylenically-unsaturated organic groups. In some embodiments, the functional, non-fluorinated, silicone polymer has a vinyl equivalent weight of no greater than 20,000 grams per equivalent, e.g., no greater than 15,000, or even no greater than 10,000 grams per equivalent. In some embodiments, the functional non-fluorinated silicone polymer has a vinyl equivalent weight of at least 250 grams per equivalent, e.g., at least 500, or even at least 1000 grams per equivalent. In some embodiments, the silicone polymer has a vinyl equivalent weight of 500 to 5000 grams per equivalent, e.g., 750 to 4000 grams per equivalent, or even 1000 to 3000 grams per equivalent.

Exemplary functional, non-fluorinated, silicone polymers include those comprising a triorganosiloxy-endblocked, polydiorganosiloxane polymer. In some embodiments, the polymer comprises $R_2SiO_{2/2}$ units (i.e., "D" units) and $R_3SiO_{1/2}$ units (i.e., "M" units), wherein each —R group independently represents a saturated or ethylenically-unsaturated, substituted or unsubstituted, hydrocarbon radical, provided that at least two R groups contain terminal ethylenic unsaturation. In some embodiments, the remaining R groups are saturated hydrocarbon radicals. In some embodiments, the remaining R groups are methyl radicals.

In some embodiments, the ethylenically-unsaturated radicals are independently selected from the group consisting of an alkenyl radical represented by the formula —$(CH_2)_m$CH=$CH_2$, wherein m is 0, 1, 2, 3, or 4. In some embodiments, m is zero, and the ethylenically-unsaturated radical is a vinyl radical. In some embodiments, m is 4, and the ethylenically-unsaturated radical is the 5-hexenyl radical.

In some embodiments, the ethylenically-unsaturated radicals are independently selected from the group consisting of the vinyl radical and higher alkenyl radicals represented by the formula —R'(CH$_2$)$_x$CH=CH$_2$ wherein R' denotes —(CH$_2$)$_y$— or —(CH$_2$)$_z$CH=CH—;
x has the value of 1, 2, or 3;
y has the value of 0, 3, or 6; and
z has the value of 3, 4, or 5.

In some embodiments, trace amounts of non-linear siloxane units are present, i.e., SiO$_{4/2}$ units (i.e., "Q" units) and RSiO$_{3/2}$, units (i.e., "T" units). In some embodiments, trace amounts of other silicon-bonded radicals, such as hydroxyl and alkoxyl may also be present.

Exemplary functional, non-fluorinated silicone polymers comprising an average of at least two ethylenically-unsaturated organic groups include those having the formula M$^{Vi}$D$_x$D$^{Vi}_y$M$^{Vi}$, wherein M represents M units, D represents D units, the superscript "Vi" indicates the presence of ethylenically-unsaturated functional groups on either the M or D units, x+y is the degree of polymerization, and the individual values for x and y satisfy the functional equivalent weights indicated previously.

Commercially available M$^{Vi}$D$_x$D$^{Vi}_y$M$^{Vi}$, non-fluorinated silicone polymers include those available under the trade designations DMS-V from Gelest Inc., e.g., DMS-V05, DMS-V21, DMS-V22, DMS-V25, DMS-V31, and DMS-V33. Other commercially available, non-fluorinated, silicone polymers comprising an average of at least two ethylenically-unsaturated organic groups include SYL-OFF 2-7170 and SYL-OFF 7850 (available from Dow Corning Corporation), VMS-T11 and SIT7900 (available from Gelest Inc.), SILMER VIN 70, SILMER VIN 100 and SILMER VIN 200 (available from Siltech Corporation), and 2,4,6,8-tetramethyl-2,4,6,8-tetravinylcyclotetrasiloxane (available from Aldrich).

Functional Fluorosilicone Polymer. Generally, any known fluorosilicone polymer having at least two crosslinkable reactive groups, e.g., two ethylenically-unsaturated organic groups, may be used as the functional fluorosilicone polymer. In some embodiments, the functional fluorosilicone polymer comprises two terminal crosslinkable groups, e.g., two terminal ethylenically-unsaturated groups. In some embodiments, the functional fluorosilicone polymer comprises pendant functional groups, e.g., pendant ethylenically-unsaturated organic groups.

Exemplary functional, fluorinated, silicone polymers include those comprising a triorganosiloxy-endblocked, polydiorganosiloxane polymer. In some embodiments, the polymer comprises R$_2$SiO$_{2/2}$ units (i.e., "D" units) and R$_3$SiO$_{1/2}$ units (i.e., "M" units), wherein each R group independently represents a saturated or ethylenically-unsaturated, substituted or unsubstituted hydrocarbon radical, provided that at least two R groups contain terminal ethylenic unsaturation. At least a portion of the remaining R groups are fluorinated hydrocarbon radicals.

In some embodiments, the functional fluorosilicone is a fluoroorganopolysiloxane polymer comprising a siloxane backbone and at least one pendant fluorinated group, for example a fluoroalkyl or a fluoroether group bonded to the siloxane backbone with a linking group. In some embodiments, the perfluoroalkyl groups are C1 to C6, e.g., C2 to C6 or C2 to C4 perfluoroalkyl groups, e.g., —C$_4$F$_9$. In some embodiments, the linking group is an alkylene group comprising at least two carbon atoms, e.g., —C$_2$H$_4$—. For example, in some embodiments, the functional fluorosilicone polymer comprises a siloxane backbone and pendant —C$_4$F$_9$ groups bonded to the backbone with —C$_2$H$_4$— linking groups. In some embodiments the pendant fluorinated group is a fluoroether group. Suitable fluoroether groups are described in the detailed description of U.S. Application No. 61/829,577 (filed 31 May 2013) and are exemplified by OR' in the structure shown below, wherein each R$^1$ is independently an alkyl or aryl;
R' is perfluoroalkyl of the formula:
—CF$_2$—C$_q$F$_{2q}$—X—C$_r$F$_{2r}$—F,
where q and r are independently 0 to 4;
X is a covalent bond, —O—, or —NR$_f^1$ where R$_f^1$ is C$_1$-C$_3$ perfluoroalkyl;

For example, one preferred fluoroether group has the structure —OCH$_2$CF(CF$_3$)OCF$_2$CF(CF$_3$)OC$_3$F$_7$ and is bonded to the siloxane backbone with a —CH$_2$CH$_2$CH$_2$— linking group.

In some embodiments, the ethylenically-unsaturated radicals are independently selected from the group consisting of an alkenyl radical represented by the formula —(CH$_2$)$_m$CH=CH$_2$, wherein m is 0, 1, 2, 3, or 4. In some embodiments, m is zero, and the ethylenically-unsaturated radical is a vinyl radical. In some embodiments, m is 4, and the ethylenically-unsaturated radical is the 5-hexenyl radical.

In some embodiments, the ethylenically-unsaturated radicals are independently selected from the group consisting of the vinyl radical and higher alkenyl radicals represented by the formula —R'(CH$_2$)$_x$CH=CH$_2$ wherein R' denotes —(CH$_2$)$_y$— or —(CH$_2$)$_z$CH=CH—;
x has the value of 1, 2, or 3;
y has the value of 0, 3, or 6; and
z has the value of 3, 4, or 5.

Exemplary functional, fluorinated silicone polymers comprising an average of at least two ethylenically-unsaturated organic groups include those having the formula M$^{Vi}$D$_x$D$^{Rf}_y$D$^{Vi}_z$M$^{Vi}$, wherein M represents M units, D represents D units, D$^{Rf}$ represents fluorinated D units, the superscript "Vi" indicates the presence of ethylenically-unsaturated functional groups on either the D or M units, the sum of x+y+z is the total degree of polymerization, and the individual values for x and y and z satisfy the functional equivalent weights indicated previously. The value of y is at least 1; preferably, y is at least 10 percent of the sum of x+y+z.

In some embodiments, trace amounts of non-linear siloxane units are present, i.e., SiO$_{4/2}$ units (i.e., "Q" units) and RSiO$_{3/2}$, units (i.e., "T" units). In some embodiments, trace amounts of other silicon-bonded radicals, such as hydroxyl and alkoxyl may also be present.

In some embodiments, the functional fluorosilicone polymer has a vinyl equivalent weight of no greater than 50,000 grams per equivalent, e.g., no greater than 30,000, or even no greater than 25,000 grams per equivalent. In some embodiments, the functional fluorosilicone polymer has a vinyl equivalent weight of at least 500 grams per equivalent, for example 1,000 grams per equivalent, e.g., at least 2,000, or even at least 3,000 grams per equivalent. In some embodiments, the functional fluorosilicone polymer has a vinyl equivalent weight of 500 to 40,000 grams per equivalent, for example 1000 to 20,000 grams per equivalent, e.g. 1500 to 10,000 grams per equivalent, e.g., 2000 to 8000 grams per equivalent, or even 3000 to 7000 grams per equivalent.

In addition, the present inventors discovered that the ratio of the vinyl equivalent weight of the functional fluorosilicone polymer over the vinyl equivalent weight of the functional non-fluorinated silicone polymer can be used to control the release force. In particular, lower release forces can be obtained as this ratio is increased. In some embodiments, the ratio of the vinyl equivalent weight of the functional fluorosilicone polymer over the vinyl equivalent weight of the functional non-fluorinated silicone polymer is at least 1, e.g., at least 2, at least 2.5 or even at least 3. In some embodiments, the ratio is from 2 to 20, for example from 2 to 15, from 2 to 10, from 2 to 5, from 2.5 to 5.5, or from 3 to 5. Any one of the above-mentioned ranges can be employed for any embodiment described herein, and can be combined with any other embodiment or aspect of the present description.

A number of useful, commercially available, functional fluorosilicone polymers are available from Dow Corning Corp. (Midland, Mich.) under the SYL-OFF series of trade designations including, e.g., SYL-OFF Q2-7785 and SYL-OFF 7786. Other functional fluorosilicone polymers are commercially available from Momentive (Columbus, Ohio), Shin-Etsu Chemical Company (Japan) and Wacker Chemie (Germany). Additional functional fluorosilicone polymers are described as component (e) at column 5, line 67 through column 7, line 27 of U.S. Pat. No. 5,082,706 (Tangney).

Crosslinking Agents. Both the functional fluorosilicone polymers and the functional, non-fluorinated, silicone polymers are particularly useful in forming release coating compositions when combined with a suitable crosslinking agent. Suitable crosslinking agents are generally known. Exemplary crosslinking agents include organohydrogensiloxane crosslinking agents, i.e, siloxane polymers containing silicon-bonded hydride groups. Suitable hydride-functional, silicone crosslinking agents include those available under the trade designations SYL-OFF 7488, SYL-OFF 7048 and SYL-OFF 7678 from Dow Corning Corp. Suitable hydride-functional, fluorosilicone crosslinking agents include those available under the trade designations SYL-OFF Q2-7560 and SL-7561 from Dow Corning Corp. Other useful crosslinking agents are disclosed in U.S. Pat. No. 5,082,706 (Tangney) and U.S. Pat. No. 5,578,381 (Hamada et al.).

Nonfunctional Fluorosilicone Polymer. As used herein, nonfunctional fluorosilicone polymer refers to fluorosilicone polymers that have neither ethylenically-unsaturated groups nor Si—H groups, or groups that react with either of these. In some embodiments, the nonfunctional fluorosilicone polymer may include certain reactive groups such as epoxy and alkoxy groups, as such groups do not readily react with either ethylenically-unsaturated groups or Si—H groups. The nonfunctional fluorosilicone polymer can have any suitable molecular weight. Typical number average molecular weights are from 250 to 250,000 daltons, e.g. 1,000 to 200,000 daltons, e.g. 5,000 to 175,000 daltons, e.g., or from 10,000 to 150,000 daltons. Any one of the above-mentioned ranges can be employed for any embodiment described herein, and can be combined with any other embodiment or aspect of the present description.

In some embodiments, nonfunctional fluorosilicone polymers may be prepared from functional fluorosilicones by converting all or substantially all of the functional groups into nonfunctional groups. As used herein, the term "capping" refers to the process of converting, e.g., through reaction, functional groups into nonfunctional groups. In some embodiments, ethylenically-unsaturated groups can be capped by reacting them with monohydride functional compounds such as pentamethyldisiloxane.

Exemplary nonfunctional, fluorinated silicone polymers include those having the formula $MD_xD^{Rf}_yM$, wherein M represents M units, D represents D units, $D^{Rf}$ represents fluorinated D units, and the sum of x+y is the degree of polymerization. The value of y is at least 1; preferably, y is at least 10 percent of the sum of x+y. In some embodiments, trace amounts of non-linear siloxane units are present, i.e., $SiO_{4/2}$ units (i.e., "Q" units) and $RSiO_{3/2}$, units (i.e., "T" units).

In some embodiments, the nonfunctional fluorosilicone is a fluoroorganopolysiloxane polymer comprising a siloxane backbone and one or more pendant fluorinated groups, for example a fluoroalkyl or a fluoroether group bonded to the siloxane backbone with a linking group. In some embodiments, the perfluoroalkyl groups are C1 to C6, e.g., C2 to C6 or C2 to C4 perfluoroalkyl groups, e.g., —$C_4F_9$. In some embodiments, the linking group is an alkylene group comprising at least two carbon atoms, e.g., —$C_2H_4$—. For example, in some embodiments, the nonfunctional fluorosilicone polymer comprises a siloxane backbone and pendant —$C_4F_9$ groups bonded to the backbone with —$C_2H_4$— linking groups. In some embodiments the pendant fluorinated group is a fluoroether group. Suitable fluoroether groups are described in the detailed description of U.S. Application No. 61/829,577 (filed 31 May 2013) and are exemplified by OR' in the structure discussed above. These groups can be used with any embodiment or combination of embodiments disclosed herein.

In some embodiments, the nonfunctional, fluorinated silicone polymers include those having the formula $M^cD_xD^{Rf}_yD^c_zM^c$, wherein M represents M units, D represents D units, $D^{Rf}$ represents fluorinated D units, c indicates capping of any functional groups present on the M or D units, and the sum of x+y+z is the degree of polymerization. The value of y is at least 1; preferably, y is at least 10 percent of the sum of x+y+z.

Catalysts. In some embodiments, one or more catalysts may also be present. Suitable catalysts include, e.g., precious metal catalysts such as platinum- and palladium-based catalysts. In some embodiments, other catalysts may be used including, e.g., tin- and iron-based catalysts.

The compositions of the present disclosure include: (a) a functional, non-fluorinated, silicone polymer; (b) a functional fluorosilicone polymer; and (c) a nonfunctional fluorosilicone polymer. The relative amounts of the various components blended to form release compositions will depend on a variety of factors including, e.g., the desired release characteristics, the adhesive to be used with the cured release composition, and the specific selection of the functional, non-fluorinated, silicone polymer(s), the functional fluorosilicone polymer(s), and the nonfunctional fluorosilicone polymer(s).

In some embodiments, the composition comprises at least 50 weight percent (wt. %) of the functional, non-fluorinated, silicone polymer based on the total weight of (a) and (b); e.g., at least 65 weight percent, or even at least 80 weight percent of the functional, non-fluorinated, silicone polymer based on the total weight of (a) and (b). In some embodiments, the composition comprises no greater than 97 weight percent, e.g., no greater than 95 weight percent of the functional, non-fluorinated, silicone polymer based on the total weight of (a) and (b). For example, in some embodiments the composition comprises 65 to 97 weight percent, e.g., 80 to 95 weight percent of the functional, non-fluorinated, silicone polymer based on the total weight of (a) and (b).

In some embodiments, the composition comprises at least 3 weight percent, e.g., at least 5 weight percent, or even at least 8 weight percent of the functional, fluorosilicone polymer based on the total weight of (a) and (b). In some embodiments, the composition comprises no greater than 50 weight percent, e.g., 35 weight percent, e.g., no greater than 20 weight percent, or even no greater than 15 weight percent of the functional, fluorosilicone polymer based on the total weight of (a) and (b). For example, in some embodiments the composition comprises 3 to 35 weight percent, e.g., 4 to 30 weight percent, 5 to 20 weight percent, or even 8 to 15 weight percent of the functional, fluorosilicone polymer based on the total weight of (a) and (b).

In some embodiments, the composition comprises at least 1 part by weight of the nonfunctional, fluorinated silicone polymer per 100 parts by weight (a) and (b). In some embodiments, the composition comprises at least 3, e.g., at least 5 parts by weight of the nonfunctional, fluorinated silicone polymer per 100 parts by weight of (a) and (b). In some embodiments, the composition comprises no greater than 30, e.g., no greater than 25, or even no greater than 15 parts by weight of the nonfunctional, fluorinated silicone polymer per 100 parts by weight of (a) and (b). In some embodiments, the composition comprises 3 to 30, e.g., 5 to 15 parts by weight of the nonfunctional, fluorinated silicone polymer per 100 parts by weight of (a) and (b).

List of Illustrative Items

The following items are illustrative of various aspects of this description, but are not intended to be limiting.

Item 1. A composition comprising a blend of:
(a) a functional, non-fluorinated, silicone polymer;
(b) a functional fluorosilicone polymer; and
(c) a nonfunctional fluorosilicone polymer.

Item 2. The composition of item 1, wherein the blend comprises at least 50 weight percent of the functional, non-fluorinated, silicone polymer based on the total weight of (a) and (b).

Item 3. The composition of item 2, wherein the blend comprises 65 to 97 weight percent, inclusive, of the functional, non-fluorinated, silicone polymer based on the total weight of (a) and (b).

Item 4. The composition of any one of the preceding items, wherein the blend comprises at least 3 weight percent of the functional fluorosilicone polymer based on the total weight of (a) and (b).

Item 5. The composition of item 4, wherein the blend comprises 3 to 35 weight percent of the functional fluorosilicone polymer based on the total weight of (a) and (b).

Item 6. The composition of any one of the preceding items, wherein the blend comprises at least 1 part by weight of the nonfunctional fluorosilicone polymer per 100 parts by weight of (a) and (b).

Item 7. The composition of item 6, wherein the blend comprises no greater than 30 parts by weight of the nonfunctional fluorosilicone polymer per 100 parts by weight of (a) and (b).

Item 8. The composition of any one of the preceding items, wherein the functional, non-fluorinated, silicone polymer comprises at least two ethylenically-unsaturated organic groups.

Item 9. The composition of item 8, wherein the functional, non-fluorinated, silicone polymer has a vinyl equivalent weight of 500 to 5000 grams per equivalent.

Item 10. The composition of any one of the preceding items, wherein the functional fluorosilicone polymer comprises at least two ethylenically-unsaturated organic groups.

Item 11. The composition of item 10, wherein the functional fluorosilicone polymer has a vinyl equivalent weight of 500 to 40,000 grams per equivalent.

Item 12. The composition of items 10 or 11, wherein the ratio of the vinyl equivalent weight of the functional fluorosilicone polymer over the vinyl equivalent weight of the functional non-fluorinated silicone polymer is at least 1.

Item 13. The composition of item 12, wherein the ratio of the vinyl equivalent weight of the functional fluorosilicone polymer to the vinyl equivalent weight of the functional non-fluorinated silicone polymer is from 2 to 20.

Item 14. The composition according to any one of the preceding items, wherein the nonfunctional fluorosilicone polymer comprises one or more fluorinated groups having two or more fluorinated carbon atoms.

Item 15. The composition of item 14, wherein the fluorinated groups of the nonfunctional fluorosilicone polymer comprise nonafluorohexyl or fluorinated ether groups.

Item 16. The composition according to any one of the preceding items, wherein the functional fluorosilicone polymer comprises fluorinated groups comprising two or more fluorinated carbon atoms.

Item 17. The composition of item 16, wherein the fluorinated groups of the functional fluorosilicone polymer comprises nonafluorohexyl or fluorinated ether groups.

Item 18. The composition according to any one of the preceding items, further comprising at least one of a silicone crosslinker and a fluorosilicone crosslinker.

Item 19. The composition according to item 18, wherein at least one crosslinker comprises a silicon bonded hydride group.

Item 20. A cured release material comprising the composition according to any one of the preceding items, wherein the functional, non-fluorinated, silicone polymer and the functional fluorosilicone polymer are crosslinked.

Item 21. The cured release material of item 20, wherein the crosslinked functional, non-fluorinated, silicone polymer comprises the reaction product of the functional, non-fluorinated, silicone polymer and a silicone crosslinker.

Item 22. The cured release material of item 20 or 21, wherein the crosslinked functional fluorosilicone polymer comprises the reaction product of the functional fluorosilicone polymer and a fluorosilicone crosslinker.

Item 23. A release liner comprising a substrate and the cured release material according to any one of items 20 to 22 bonded to at least a portion of at least one surface of the substrate.

Item 24. An adhesive article comprising the release liner of item 23 and an adhesive in contact with the at least a portion of at least one surface of the cured release material.

Item 25. The adhesive article of item 24, wherein the adhesive is a silicone adhesive.

Item 26. The adhesive article of item 25, wherein the silicone adhesive is an e-beam cured silicone adhesive.

Item 27. The adhesive article of item 25, wherein the silicone adhesive is a silicone polyurea adhesive.

Item 28. The adhesive article of item 25, wherein the silicone adhesive is a polydiorganosiloxane-polyoxamide adhesive.

Item 29. A method of forming a release article comprising: applying the composition according to any one of items 1 to 19 to at least a portion of at least one surface of a substrate, and crosslinking the functional, non-fluorinated, silicone polymer and the functional fluorosilicone polymer.

Item 30. The method of item 29, wherein crosslinking the functional, non-fluorinated, silicone polymer comprising reacting the functional, non-fluorinated, silicone polymer with a silicone crosslinker.

Item 31. The method of item 29 or 30, wherein crosslinking the functional fluorosilicone polymer comprising reacting the functional fluorosilicone polymer with a fluorosilicone crosslinker.

Item 32. The method according to any one of items 29 to 31, wherein applying the composition comprises applying the composition in a solvent and the method further comprises removing solvent.

Item 33. A method of forming an adhesive article comprising: applying an adhesive to the release material of any one of items 20 to 23.

Item 34. The method of item 33, wherein applying the adhesive comprises laminating a cured adhesive to the release material.

Item 35. The method of item 33, wherein applying the adhesive comprises applying an uncured adhesive to the release material and curing the adhesive.

Item 36. A composition comprising a blend of:
(a) at least 80 to no greater than 95 weight percent based on the total weight of (a) and (b) of a functional, non-fluorinated, silicone polymer comprising at least two ethylenically-unsaturated groups;
(b) at least 5 to no greater than 20 weight percent based on the total weight of (a) and (b) of a functional fluorosilicone polymer comprising at least two ethylenically-unsaturated groups; and
(c) at least 1 to no greater than 15 parts by weight of a nonfunctional fluorosilicone polymer based on 100 parts by weight of (a) and (b).

Item 37. The composition of item 36, wherein the functional, non-fluorinated, silicone polymer has a vinyl equivalent weight of 500 to 5000 grams per equivalent; the functional fluorosilicone polymer has a vinyl equivalent weight of 500 to 40,000 grams per equivalent; and the ratio of the vinyl equivalent weight of the functional fluorosilicone polymer over the vinyl equivalent weight of the functional non-fluorinated silicone polymer is at least between 2 and 6, inclusive.

Item 38. The composition of item 36 or 37, wherein the nonfunctional fluorosilicone polymer comprises fluorinated groups comprising two or more fluorinated carbon atoms; and the functional fluorosilicone polymer comprises fluorinated groups comprising two or more fluorinated carbon atoms.

Item 39. A cured release material comprising the composition according to any one of the items 36 to 38, wherein the functional, non-fluorinated, silicone polymer and the functional fluorosilicone polymer are crosslinked.

Item 40. The cured release material of item 39, wherein the crosslinked functional, non-fluorinated, silicone polymer comprises the reaction product of the functional, non-fluorinated, silicone polymer and a silicone crosslinker; and wherein the crosslinked functional fluorosilicone polymer comprises the reaction product of the functional fluorosilicone polymer and a fluorosilicone crosslinker.

Item 41. A release liner comprising a substrate and the cured release material according to item 40 bonded to at least a portion of at least one surface of the substrate.

Item 42. An adhesive article comprising the release liner of item 41 and a silicone adhesive in contact with at least a portion of at least one surface of the cured release material.

EXAMPLES

Functional Non-Fluorinated Silicone Polymers: Fn-XF-SP.

Functional, non-fluorinated silicone polymer Fn-XF-SP-A was prepared as follows. A polyethylene bottle was charged with 750.0 g (2.529 mol) of octamethylcyclotetrasiloxane ($D_4$, Gelest), 51.0 g (0.273 mol) of 1,3-divinyltetramethyldisiloxane ($M^{vi}$-$M^{vi}$, Gelest), 4.0 g of activated carbon and 0.8 g of concentrated sulfuric acid. The resultant mixture was shaken at room temperature for 36 hours. The mixture was filtered, and the filtrate was stripped of volatile material using a wiped film evaporator operating at a pressure of 20 Pa (0.15 Torr) and a jacket temperature of 175° C., providing 635.0 g of the product, Fn-XF-SP-A, a clear, colorless liquid. The $^1$H and $^{29}$Si NMR spectra for Fn-XF-SP-A were consistent with the desired structure.

TABLE 1A

Summary of functional, non-fluorinated, silicone polymers.

| I.D. | Functionality | Eq. Wt. (g/mole) | Trade name | Source |
|---|---|---|---|---|
| Fn-XF-SP-A | Vinyl | 1400 | | Preparation described herein |
| Fn-XF-SP-B | Vinyl | 2000 | VIN 70 | Siltech |
| Fn-XF-SP-D | Vinyl | 3000 | V21 | Gelest |
| Fn-XF-SP-E | Vinyl | 4700 | V22 | Gelest |

Functional Fluorosilicone Polymers: Fn-FSP.

TABLE 1B

Summary of functional, fluorosilicone polymers.

| I.D. | Functionality | Eq. Wt. (g/mole) | Fluorinated groups | Trade name | Source |
|---|---|---|---|---|---|
| Fn-FSP-A | Vinyl | 2600 | Trifluoropropyl | FSR 2000 | Momentive |
| Fn-FSP-B | Vinyl | 5100 | Trifluoropropyl | 7555 | Dow Corning |
| Fn-FSP-C | Vinyl | 5500 | Nonafluorohexyl | 7786 | Dow Corning |
| Fn-FSP-D | Vinyl (*) | 17,000 (#) | Nonafluorohexyl | Q2-7785 | Dow Corning |
| Fn-FSP-E | Vinyl (*) | 30,000 (##) | (###) | X-70-201S | Shin-Etsu |

(*) Fn-FSP-B and Fn-FSP-E include both terminal and pendant functional groups.
(#) Calculated vinyl equivalent weight excluding 2-3 percent 1,3-divinyltetramethyldisiloxane contained in the commercial product. Also excludes solvent present in polymer as purchased.
(##) Calculated vinyl equivalent weight excluding solvent present in polymer as purchased.
(###) —$CH_2CH_2CH_2$—$OCH_2CF(CF_3)OCF_2CF(CF_3)OC_3F_7$ Nonfunctional Fluorosilicone Polymers: NFn-FSP.

Nonfunctional, fluorosilicone polymers were prepared by capping vinyl-functional polyorganosiloxane polymers. In particular, the vinyl functional groups were capped by reaction with pentamethyldisiloxane, a monohydride functional capping agent.

Nonfunctional, fluorosilicone polymer NFn-FSP-A. To 100.00 g of Dow Corning SYL-OFF 7786 (vinyl-functional fluorosilicone polymer formulated with a platinum hydrosilylation catalyst, 100 weight percent solids, approximately 16.6 mmol of vinyl functionality) were added 50 mL of heptane, 50 mL of ethyl acetate and 7.37 g (49.7 mmol) of pentamethyldisiloxane (Gelest). The resulting mixture was heated at 60° C. for 6 hours. Solvent and excess pentamethyldisiloxane were separated under reduced pressure to provide 102.40 g of the product, NFn-FSP-A, a viscous, amber liquid. The $^1$H and $^{29}$Si NMR spectra for NFn-FSP-A indicated complete consumption of starting vinyl functionality and were consistent with the structure of the desired product.

Nonfunctional, fluorosilicone polymer NFn-FSP-B. A nonfunctional fluorosilicone polymer having $-C_3H_6OC_4F_9$ pendant groups was prepared according to Example 4 of U.S. Application No. 61/829,577 ("Fluoroalkyl Silicones", Qiu and Rathore, filed 31 May 2013).

Nonfunctional, fluorosilicone polymer NFn-FSP-F. To 50.00 g of Momentive FF160 (vinyl-functional fluorosilicone polymer, 100 weight percent solids, approximately 2.0 mmol of vinyl functionality) were added 50 mL of heptane and 1.48 g (10.0 mmol) of pentamethyldisiloxane (Gelest). The resulting mixture was heated to 60° C., and 50 mg of a 2.1-2.4 weight percent solution of platinum(0) in xylene (Gelest) were added. The reaction mixture was maintained at 60° C. overnight. Solvent and excess of pentamethyldisiloxane were separated under reduced pressure to provide 50.30 g of the product, NFn-FSP-F, a viscous, light amber liquid. The $^1$H and $^{29}$Si NMR spectra for NFn-FSP-F indicated complete consumption of starting vinyl functionality and were consistent with the structure of the desired product.

Nonfunctional, fluorosilicone polymer NFn-FSP-G. To 110.11 g of Dow Corning Syl-Off Q2-7785 (vinyl-functional fluorosilicone polymer formulated with a platinum hydrosilylation catalyst, 88 weight percent solids in heptane, 96.9 g of polymer, approximately 32.3 mmol of vinyl functionality) were added an additional 100 mL of heptane and 13.10 g (88.3 mmol) of pentamethyldisiloxane (Gelest), and the resulting mixture was heated at 60° C. overnight. Solvent and excess of pentamethyldisiloxane were separated under reduced pressure to provide 100.45 g of a viscous, light amber fluid. To this was added 25.11 g of heptane to provide an 80 weight percent solids solution of the product, NFn-FSP-G. The $^1$H and $^{29}$Si NMR spectra indicated complete consumption of starting vinyl functionality and were consistent with the structure of the desired product.

TABLE 1C

Summary of nonfunctional, fluorosilicone polymers.

| I.D. | MW (g/mole) | Fluorinated groups | Trade name | Source |
|---|---|---|---|---|
| NFn-FSP-A | 11,000 | Nonafluorohexyl | | Preparation described herein |
| NFn-FSP-B | 13,300 | $-C_3H_6-O-C_4F_9$ | | U.S. application Ser. No. 61/829,577 (Ex. 4) |
| NFn-FSP-C | 14,000 | Trifluoropropyl | FMS-141 | Dow Corning |
| NFn-FSP-F | 51,000 | Trifluoropropyl | | Preparation described herein |
| NFn-FSP-G | 137,000 | Nonafluorohexyl | | Preparation described herein |

TABLE 1D

Summary of crosslinkers.

| Class | I.D. | Function | Eq. Wt. (g/mole) | Trade name | Source |
|---|---|---|---|---|---|
| Silicone Crosslinker | SXL-1 | hydride | 76 | 7488 | Dow Corning |
|  | SXL-2 | hydride | 97 | 7678 | Dow Corning |
| Fluorosilicone Crosslinker | FXL-1 | hydride | 166 | SL 7561 | Dow Corning |
|  | FXL-2 | hydride | 224 | Q2 7560 | Dow Corning |

Unless noted in the Examples and Comparative Examples described below, release coatings were prepared using the follow general methods. Formulated release solutions were made by mixing functional silicone polymers (non-fluorinated and/or fluorinated) with the appropriate amount of hydride functional crosslinker in 20:80 heptane:ethyl acetate. For formulations containing more than one functional polymer, the appropriate crosslinker was added in the amounts needed for each functional component. Table 1E lists which crosslinkers and the hydride to vinyl ratio used for each functional silicone polymer.

TABLE 1E

Crosslinkers and hydride to vinyl ratios used for each functional polymer.

| Functional Polymer ID | Crosslinker | Hydride to Vinyl Ratio |
|---|---|---|
| Fn-XF-SP-A | SXL-2 | 1.20 |
| Fn-XF-SP-B | SXL-2 | 1.20 |
| Fn-XF-SP-C | SXL-1 | 1.20 |
| Fn-XF-SP-D | SXL-2 | 1.32 |
| Fn-XF-SP-E | SXL-2 | 1.55 |
| Fn-FSP-A | SXL-1 | 1.5 |
| Fn-FSP-B | FXL-1 | 1.6 |
| Fn-FSP-C | FXL-2 | 2.0 |
| Fn-FSP-D | FXL-2 | 2.92 (#) |

(#) Hydride to vinyl excluding 2-3 percent 1,3-divinyltetramethyldisiloxane contained in the commercial product.

Fn-FSP-E, which is sold as a mixture of crosslinker and fluorosilicone, was used as received from the manufacturer.

All of the functional silicone polymers listed in Table 1E already contained platinum hydrosilylation catalyst and inhibitor except Fn-XF-SP-B, Fn-FSP-A and Fn-FSP-E which were missing one or both of these. 120 ppm of Pt catalyst (platinum-divinyltetramethyldisiloxane complex in xylene from Gelest) and 0.2 weight percent inhibitor (diallyl maleate available from Momentive) were added to Fn-XF-SP-B. 0.2 weight percent inhibitor (diallyl maleate available from Momentive) was added to Fn-FSP-A. 0.5 parts of CAT-50-Pl (Pt catalyst in solvent from Shin-Etsu) was added to 100 parts of Fn-FSP-E as recommended by the manufacturer.

Some solutions had additional nonfunctional polymers added to them, reported as part per hundred (pph) by weight based on 100 parts by weight of the functional polymers.

Rod Coating. Formulated release solutions were made at 15 weight percent solids in 20:80 heptane:ethyl acetate. These solutions were then coated on to Hostaphan 3SAB polyester backing (primed polyester available from Mitsubishi Polyester Film, Inc) using a #5 Mayer rod (wire wound rod available from RDS, Inc.) and thermally cured in an oven at 120° C. for five minutes.

Gravure Coating. Alternatively some release coatings were made by gravure coating 7 or 11 weight percent solids solutions in 20:80 heptane:ethyl acetate on to Hostaphan 3SAB polyester film with a 60 pyramidal roll. Gravure coated samples were cured in-line at 120° C. for approximately 45 seconds (oven length of 11.3 meters, line speed of 15.2 meters/minute).

Prepared release liners were aged for a minimum of one week at 23° C. and 50 percent relative humidity before any tests were conducted. Unless otherwise noted, release test samples were prepared by laminating (using a 15 cm wide soft rubber roller and light pressure) the release liners to various cured, silicone adhesives. The resulting samples were aged at either 50° C. or 70° C. for predetermined amounts of time such as 3 days, 14 days, 28 days, 56 days and 112 days. All samples were then re-equilibrated at 23° C. and 50 percent relative humidity for at least one day prior to testing.

After aging and re-equilibration, a 2.54 or 1.6 centimeter wide and approximately 20 centimeter long sample of the test sample was cut using a specimen razor cutter. The cut sample was applied lengthwise onto the platen surface of a peel adhesion tester (an IMASS SP-2100 tester, obtained from IMASS, Inc., Accord, Mass.) using 3M Double Coated Paper Tape 410M (available from 3M Company, St. Paul, Minn., USA). The release liner was peeled from the adhesive at an angle of 180 degrees at, e.g., 30.5 cm/minute.

Readhesion samples were prepared by applying the adhesive strip exposed by the release test to either a clean stainless steel plate or a clean glass plate using two back and forth passes (four passes total) with a with a 4.4 cm wide two kilogram rubber roller. Readhesions for ADH-1, ADH-2, and ADH-3 were all measured using a stainless steel plate, while readhesions for ADH-4, ADH-5 and ADH-6 all used glass as the substrate. Regardless of the substrate used, readhesion was measured without dwell time by measuring the force required to peel the adhesive from the plate at an angle of 180 degrees at, e.g., 30.5 cm/minute.

For some samples, release and readhesion were tested at speeds greater than 30.5 cm/minute as noted in the results presented below. For speeds greater than 762 cm/minute, an IMASS ZPE-1100W tester (obtained from IMASS, Inc., Accord, Mass.) and samples approximately 40 cm in length were used.

Electron beam cured silicone adhesives (ADH-1, ADH-2). ADH-1 was prepared according to Example 24 described in U.S. Pat. No. 8,541,481, except the adhesive was coated onto a rayon-rich nonwoven fabric with a 12 micron polyester elastomer film. The adhesive thickness was 100 microns (4 mils). ADH-2 was prepared in the same manner except ADH-2 contained 38 weight percent MQ tackifier with the remainder being silanol functional PDMS fluid.

Commercial silicone adhesive tapes (ADH-3, ADH-4). ADH-3 is commercially available from 3M Company as 3M Kind Removal Silicone Tape 2775-1. ADH-3 is a soft silicone adhesive designed to stick to skin and is similar to ADH-1 and ADH-2. ADH-4 is commercially available from 3M Company as 3M Polyester Tape 8403 Green tapes. ADH-4 is a peroxide-cured silicone adhesive that is stiffer adhesive than ADH-3.

Thermal dried silicone adhesives (ADH-5, ADH-6). ADH-5 is a tackified, polydiorganosiloxane-polyurea block copolymer silicone adhesive and was prepared according to Example 28 described in U.S. Pat. No. 7,078,093. ADH-6 is a tackified, polydiorganosiloxane-polyoxamide block copolymer silicone. ADH-6 was prepared by making an elastomer with the composition of Example 12 in WO 2011/082069 and blending it with 100 parts on a dry basis of SR545 MQ resin purchased from Momentive. Solvent was added to give overall solids of 35 weight percent in a solvent mixture of ethyl acetate/IPA/toluene 63/19/18. Both ADH-5 and ADH-6 were coated on to Hostaphan 3SAB so as to produce dry thickness of 51 mils after thermal drying (described in ADH-5 preparation).

Control-1 was a commercially available release liner used with silicone PSAs available as SCOTCHPAK 9741 release liner from 3M Company. The liner consists of perfluorinated polymer coated polyester substrate. In some embodiments, release values comparable to the performance of Control-1 may be desirable, as this liner provides lower release forces (i.e., premium) with some silicone adhesives, and is commercially acceptable for many applications.

CE-1 was a commercially available release liner used with silicone PSAs available as M117 release liner from Siliconature LLC. The liner is believed to consist of a fluorosilicone polymer having trifluoropropyl groups coated on a polyester substrate. This liner is generally known to provide higher release forces than Control-1 against a variety of silicone adhesives.

Examples EX-1 and EX-2

Examples were prepared by combining (X) a functional, non-fluorinated, silicone polymer, (Y) a functional, fluorosilicone polymer, and (Z) a nonfunctional, fluorosilicone polymer to form release coatings, as summarized in Table 2. All samples were coated on the 3SAB backing using a #5 Mayer rod.

TABLE 2

Compositions of Examples EX-1 and EX-2.

| I.D. | (X) Fn-XF-SP | (Y) Fn-FSP | (Z) NFn-FSP | Composition | Coating solution |
|---|---|---|---|---|---|
| EX-1 | B | C | G | 90:10 X:Y + | 15 wt. % in |
| EX-2 | B | C | A | 12 pph Z | 20:80 Hept:EthAc |

Samples were prepared with the Control-1, CE-1, EX-1 and EX-2 materials using adhesive ADH-1 (e-beam cured silicone adhesive). Release and readhesion tests were performed according to the general method for release/readhesion testing described above. A stainless steel plate was used when measuring the readhesion values. As shown in Table 3, the blended release compositions provided premium (i.e., lower) release force comparable to that obtained with the high-cost, perfluorinated release material of Control-1, with no loss of readhesion that might be expected when incorporating nonfunctional materials into a release composition.

TABLE 3

Results using ebeam-cured silicone adhesives with the liners of Table 2.

| | 3 days at 50° C. | | 14 days at 50° C. | |
|---|---|---|---|---|
| I.D. | Release (g/25 mm) | Readhesion (g/25 mm) | Release (g/25 mm) | Readhesion (g/25 mm) |
| Control-1 | 43 | 204 | 39 | 206 |
| EX-1 | 21 | 199 | 19 | 195 |
| EX-2 | 15 | 213 | 31 | 207 |
| CE-1 | 85 | 211 | 100 | 214 |

As shown in Table 3, blended release compositions of the present disclosure provided significantly lower release forces than those obtained with CE-1, a conventional fluorosilicone release material. The release performance of one exemplary release material according to some embodiments of the present disclosure was compared to a variety of other common fluorosilicone release materials over a range of peel speeds.

The blend of EX-1 (90:10 parts by weight Fn-XF-SP-B:Fn-FSP-C with 12 pph NFn-FSP-G) was gravure coated from 11 weight percent solids on to Hostaphan 3SAB polyester film and cured in-line to yield a dry coat weight of about 1.0 gram per square meter. Common fluorosilicone release materials were coated from various solvents and solvent blends on Hostaphan 3SAB polyester film using a #5 Mayer rod and cured to produce dry coat weights of about 1.0 grams per square meter. The resulting samples were laminated to adhesive ADH-3 and aged for 14 days at 50° C. The premium release characteristics of the blended compositions of the present disclosure are apparent from the results summarized in Table 4.

TABLE 4

Release and readhesion compared to commercial fluorosilicone release materials.

| | | Release (gm/25 mm) | | | | | Readhesion |
|---|---|---|---|---|---|---|---|
| I.D. | Composition | 30.5 cm/min | 229 cm/min | 762 cm/min | 1524 cm/min | 3048 cm/min | (gm/25 mm) |
| EX-1 | Blend* | 6 | 30 | 137 | 215 | 336 | 434 |
| CE-2 | Fn-FSP-A | 61 | 217 | N/T | 428 | 589 | 364 |
| CE-3 | Fn-FSP-B | 62 | 236 | 384 | 468 | 614 | 348 |
| CE-4 | Fn-FSP-C | 43 | 193 | 356 | 468 | 593 | 407 |
| CE-5 | Fn-FSP-D | 87 | 263 | 460 | 580 | 724 | 371 |

*90:10 Fn-XF-SP-B:Fn-FSP-C + 12 pph NFn-FSP-G
N/T = not tested.

The performance of exemplary blended release compositions of the present disclosure was compared to similar systems containing only one or two of the three components present in the blended release compositions of the present disclosure. The compositions of these comparative examples are summarized in Table 5A.

TABLE 5A

Release compositions comparing one- and two-part systems to three-part compositions.

| I.D. | (X) Fn-XF-SP | (Y) Fn-FSP | (Z) NFn-FSP | Composition | Coating solution |
|---|---|---|---|---|---|
| CE-6 | — | C | — | 100 X | 11.2 wt. % in HFE 7500 |
| CE-7 | — | C | G | 100 Y + 12 pph Z | |
| CE-8 | B | C | — | 90:10 X:Y | 15 wt. % in |
| EX-1 | B | C | G | 90:10 X:Y + 12 pph Z | 20:80 Hept:EthAc |
| EX-2 | B | C | A | | |

Release coatings were prepared to produce dry coat weights of about 1.0 grams per square meter. Adhesive ADH-1 was laminated to the release coatings. The release and readhesion forces are summarized in Table 5B. The compositions and results for three component systems of Examples EX-1 and EX-2 are included for comparison.

TABLE 5B

Release and readhesion results using adhesive ADH-1.

| | 3 days at 50° C. | | 14 days at 50° C. | |
|---|---|---|---|---|
| I.D. | Release (g/25 mm) | Readhesion (g/25 mm) | Release (g/25 mm) | Readhesion (g/25 mm) |
| CE-6 | 67 | 212 | 75 | 225 |
| CE-7 | 23 | 223 | 21 | 220 |
| CE-8 | 105 | 222 | 123 | 260 |
| EX-1 | 21 | 199 | 19 | 195 |
| EX-2 | 15 | 213 | 31 | 207 |

Both low speed and high speed peel of a liner from an adhesive can be important. High speed peel tests were conducted using select liners from Table 2. The results are summarized in Table 6. As shown, although CE-7 had release values comparable to those obtained with EX-1 and EX-2 at low speeds, at high speeds, the release value of CE-7 was about twice as high as the exemplary release materials of the present disclosure.

TABLE 6

High speed peel test results.

| | Release (g/25 mm) | | |
|---|---|---|---|
| I.D. | 30.5 cm/min | 229 cm/min | 762 cm/min |
| EX-1 | 19 | 58 | 140 |
| EX-2 | 31 | 78 | 120 |
| CE-7 | 21 | 81 | 250 |

In some applications it may be desirable to tailor the release force to meet certain objectives. In some embodiments, various attributes of one or more of the three required components of the blended release materials of the present disclosure may be adjusted to modify the resulting release characteristics; often without adversely affecting the readhesion properties.

The release materials of EX-1 and EX-2 were prepared using nonfunctional, fluorosilicone polymers with nonafluorohexyl fluorinated groups. Samples prepared with other nonfunctional polymers are summarized in Table 7A. Release and readhesion results are summarized in Table 7B, along with the results obtained with EX-1 and EX-2, repeated from Table 3 for comparison.

All samples were prepared as a 90:10 blend of X:Y with 12 pph Z. The coatings were prepared as a 15 weight percent solids solutions in a 20:80 blend of heptane and ethyl acetate. Examples EX-3 and EX-4 were prepared with nonfunctional, fluorosilicone polymers having trifluoropropyl fluorinated groups (NFn-FSP-C and NFn-FSP-F, respectively). CE-9 was prepared using a nonfunctional, non-fluorinated silicone polymer (DMS-T35 silicone polymer available from Gelest, MW of 49,400 g/mole).

TABLE 7A

Compositions of Examples EX-1 and EX-2, and various comparative examples.

| I.D. | (X) Fn-XF-SP | (Y) Fn-FSP | (Z) NFn-FSP | Composition | Coating solution |
|---|---|---|---|---|---|
| EX-3 | B | C | C | 90:10 X:Y + | 15 wt. % in |
| EX-4 | B | C | F | 12 pph Z | 20:80 Hept:EthAc |
| CE-9 | B | C | * | | |

* Nonfunctional, non-fluorinated, silicone polymer (DMS-T35 silicone from Gelest).

As shown in Table 7B, the use of nonfunctional fluoropolymers having fluorinated groups containing more than one fluorinated carbon, e.g., nonafluorohexyl groups, resulted in lower release forces. In comparison, similar compositions using nonfunctional fluoropolymers having fluorinated groups containing only one fluorinated carbon, e.g., trifluoropropyl groups, exhibited much higher release forces, comparable to the use of a non-fluorinated, nonfunctional silicone polymer. Thus, one could use the number of fluorinated carbons to tailor the release force of compositions of the present disclosure. In some embodiments, depending on the adhesive and the release force desired, it may be desirable to use nonfunctional fluorosilicones having fluorinated groups having at least two fluorinated carbons, for example, at least four fluorinated carbon atoms.

TABLE 7B

Release and readhesion results.

| | Fluorinated | 3 days at 50° C. | | 14 days at 50° C. | |
|---|---|---|---|---|---|
| I.D. | groups of the NFn-FSP | Release (g/25 mm) | Readhesion (g/25 mm) | Release (g/25 mm) | Readhesion (g/25 mm) |
| EX-1 | Nonafluorohexyl | 21 | 199 | 19 | 195 |
| EX-2 | Nonafluorohexyl | 15 | 213 | 31 | 207 |
| EX-3 | Trifluoropropyl | 99 | 216 | 126 | 215 |
| EX-4 | Trifluoropropyl | 80 | 214 | 103 | 213 |

TABLE 7B-continued

Release and readhesion results.

| | Fluorinated | 3 days at 50° C. | | 14 days at 50° C. | |
|---|---|---|---|---|---|
| I.D. | groups of the NFn-FSP | Release (g/25 mm) | Readhesion (g/25 mm) | Release (g/25 mm) | Readhesion (g/25 mm) |
| CE-9 | None (silicone) | 87 | 208 | 119 | 208 |

As summarized in Table 8A, release compositions were prepared with similar compositions, but with functional, non-fluorinated silicone polymers with different equivalent weights. All samples were prepared as a 90:10 weight ratio of X:Y with 8 pph Z. The compositions were prepared as a 7 weight percent solids solutions in 20:80 blend of heptane: ethyl acetate. Dry release coatings were produced by gravure coating these solutions onto Hostaphan 3SAB and thermally curing them in line to yield a dry release coat weight of about 0.7 grams per square meter.

TABLE 8A

Release compositions with varying equivalent weight silicone polymers.

| I.D. | (X) Fn-XF-SP | (X) Eq. Wt. | (Y) Fn-FSP | (Z) NFn-FSP |
|---|---|---|---|---|
| EX-5 | A | 1400 | C | G |
| EX-6 | D | 3000 | C | G |
| EX-7 | E | 4700 | C | G |

ADH-2 was laminated to the release coatings. Test results are presented in Table 8B. Results obtained with the liner of Control-1 are shown for comparison. Generally, as the vinyl equivalent weight is increased, the crosslink density will decrease. As shown in Table 8B, in some embodiments, the vinyl equivalent weight can be used to adjust the release force without affecting readhesion, as the release force also increases with the increase in vinyl equivalent weight.

TABLE 8B

Impact of vinyl equivalent weight of the functional silicone on release and readhesion.

| | 3 days at 50° C. | | 14 days at 50° C. | |
|---|---|---|---|---|
| I.D. | Release (g/25 mm) | Readhesion (g/25 mm) | Release (g/25 mm) | Readhesion (g/25 mm) |
| Control-1 | 82 | 288 | 50 | 216 |
| EX-5 | 26 | 249 | 15 | 269 |
| EX-6 | 55 | 229 | 41 | 257 |
| EX-7 | 88 | 257 | 112 | 260 |

In some embodiments, release force can also be adjusted by varying the amount of nonfunctional, fluorosilicone polymer. As summarized in Table 9A, release compositions were prepared as a 90:10 weight ratio of X:Y with varying amounts of Z, the nonfunctional, fluorosilicone polymer.

TABLE 9A

Release compositions with varying amounts of nonfunctional, fluorosilicone polymer

| I.D. | (X) Fn-XF-SP | (Y) Fn-FSP | (Z) NFn-FSP | (Z) pph |
|---|---|---|---|---|
| CE-10 | B | C | — | 0 |
| EX-8 | B | C | G | 1 |
| EX-9 | B | C | G | 2 |
| EX-10 | B | C | G | 4 |
| EX-11 | B | C | G | 12 |

ADH-3 was laminated to the prepared release coatings. The samples were then aged for 28 days at 50° C. Release and readhesion were tested at low speed and high speed. The results, summarized in Table 9B, illustrate the ability to use the amount of the nonfunctional, fluorosilicone polymer to adjust the release performance with no adverse impact on readhesion.

TABLE 9B

Release and readhesion variation with the amount of nonfunctional fluorosilicone.

| | | 30.5 cm/min | | 229 cm/min | |
|---|---|---|---|---|---|
| I.D. | pph Z | Release (g/25 mm) | Readhesion (g/25 mm) | Release (g/25 mm) | Readhesion (g/25 mm) |
| CE-10 | 0 | 91 | 148 | 222 | 331 |
| EX-8 | 1 | 35 | 133 | 95 | 323 |
| EX-9 | 2 | 19 | 138 | 57 | 334 |
| EX-10 | 4 | 4 | 154 | 67 | 335 |
| EX-11 | 12 | 6 | 140 | 22 | 321 |

The release performance of various blended release compositions were evaluated with a variety of standard and aggressive silicone adhesives. The release compositions summarized in Table 10A were gravure coated on to Hostaphan 3SAB polyester film and cured in line. The dry coat weight of EX-13 was slightly below target at about 0.85 gram per square meter. ADH-4 was laminated to the prepared release coatings. The resulting samples were aged for 14 days at 70° C.

TABLE 10A

Release compositions.

| I.D. | (X) Fn-XF-SP | (Y) Fn-FSP | (Z) NFn-FSP | Composition | Coating solution |
|---|---|---|---|---|---|
| EX-12 | B | C | G | 95:5 X:Y + 4 pph Z | 11 wt. % in 20:80 Heptane:Ethyl Acetate |
| EX-13 | A | C | G | 90:10 X:Y + 4 pph Z | 9 wt. % in 20:80 Heptane:Ethyl Acetate |
| EX-14 | B | C | G | 90:10 X:Y + 12 pph Z | 11 wt. % in 20:80 Heptane:Ethyl Acetate |

As summarized in Table 10B, various blended release compositions of the present disclosure provided premium release performance with this peroxide-cure, silicone adhesive. Although further reductions in release force can be achieved by increasing the amount of component (Z), the nonfunctional fluorinated silicone polymer, EX-14 illustrates that readhesion results may be adversely affected.

TABLE 10B

Release and readhesion results with a peroxide-cured, silicone adhesive.

| | 30.5 cm/min | | 229 cm/min | |
|---|---|---|---|---|
| I.D. | Release (g/25 mm) | Readhesion (g/25 mm) | Release (g/25 mm) | Readhesion (g/25 mm) |
| EX-12 | 18 | 509 | 25 | 894 |
| EX-13 | 5 | 704 | 5 | 1038 |
| EX-14 | 3 | 359 | 4 | 568 |

The release compositions summarized in Table 11A were tested using a silicone polyurea adhesive, ADH-5. In this test, CE-11 was coated significantly thicker than 1.0 gram per square meter in order to achieve premium performance.

TABLE 11A

Release compositions.

| I.D. | (X) Fn-XF-SP | (Y) Fn-FSP | (Z) NFn-FSP | Composition | Coating solution |
|---|---|---|---|---|---|
| CE-11 | — | C | — | 100 Y | 21 wt. % in HFE7500 gravure coated |
| CE-12 | A | C | — | 90:10 X:Y | 15 wt. % in 20:80 Heptane:Ethyl Acetate |
| EX-15 | A | C | G | 90:10 X:Y + 12 pph Z | |
| EX-16 | B | C | G | 90:10 X:Y + 12 pph Z | coated with #5 Mayer rod |

As summarized in Table 11B, premium release performance was obtained with various blended release compositions of the present disclosure, even with this aggressive silicone adhesive. In addition, in contrast to single- and dual-component release formulations exemplified by Comparative Examples CE-11 and CE-12, the release force obtained when using the three-component compositions of the present disclosure was not adversely affected by extended aging.

TABLE 11B

Release results with a silicone polurea adhesive.

| | Release at 152 cm/min (g/25 mm) | | | | |
|---|---|---|---|---|---|
| I.D. | 7 days at 50° C. | 14 days at 50° C. | 28 days at 50° C. | 56 days at 50° C. | 112 days at 50° C. |
| CE-11 | 28 | 39 | 57 | 96 | 121 |
| CE-12 | 72 | 103 | 180 | 279 | 304 |
| EX-15 | 5 | 6 | 5 | 5 | 6 |
| EX-16 | 9 | 11 | 10 | 9 | 11 |

The same release compositions summarized in Table 11A were also tested using a silicone polyoxamide block copolymer based adhesive, ADH-6. Like the ADH-5 silicone polyurea adhesive, ADH-6 is an aggressive silicone adhesive. As summarized in Table 11C, various blended release compositions of the present disclosure provided premium release performance with this aggressive silicone adhesive. In addition, in contrast to the comparative release formulations, the release force was not adversely affected by extended aging.

TABLE 11C

Release results with a silicone polyoxamide
block copolymer based adhesive.

| | Release at 152 cm/min (g/25 mm) | | | | |
|---|---|---|---|---|---|
| I.D. | 7 days at 50° C. | 14 days at 50° C. | 28 days at 50° C. | 56 days at 50° C. | 112 days at 50° C. |
| CE-11 | 38 | 55 | 74 | 76 | 168 |
| CE-12 | 241 | 277 | 359 | 411 | 458 |
| EX-15 | 4 | 5 | 4 | 7 | 9 |
| EX-16 | 8 | 9 | 10 | 19 | 24 |

One deficiency with some prior art release coatings is the inability to coat and cure adhesives directly on the release material. In such cases, the adhesives are often coated on a separate process liner, cured, and then transferred to the desired release material. Such a process requires additional steps and costs. In addition, in some applications it may be desirable to bond adhesives to porous substrates such as foams. In such embodiments, it may be difficult or impossible to coat the adhesive directly on the substrate, and coating the adhesive on the release material may be more practical or efficient.

The release materials summarized in Table 12A were prepared, coated, and cured. Adhesive ADH-1 was coated directly on the release materials and then e-beam cured. The same general procedure described for making ADH-1 was followed to make these samples except that the adhesive was coated on the release liner instead of the backing. After e-beam curing the backing was laminated to the adhesive coated release liner to make the test samples. The release and readhesion results are summarized in Table 12B. As shown, superior release and readhesion results were obtained with the blended release compositions of the present disclosure, even when compared to a commercial, premium release liner.

TABLE 12A

Release compositions.

| I.D. | (X) Fn-XF-SP | (Y) Fn-FSP | (Z) NFn-FSP | Composition | Coating solution |
|---|---|---|---|---|---|
| Control-1 | — | W9741 | — | Commercial, premium release liner | |
| CE-13 | B | C | — | 90:10 X:Y | 15 wt. % in |
| EX-17 | B | C | G | 90:10 X:Y + 12 pph Z | 20:80 Heptane:Ethyl Acetate |
| EX-18 | B | C | A | 90:10 X:Y + 12 pph Z | coated with #5 Mayer rod |

TABLE 12B

Release and readhesion with direct adhesive coating.

| | 3 days at 50° C. | | 14 days at 50° C. | |
|---|---|---|---|---|
| I.D. | Release (g/25 mm) | Readhesion (g/25 mm) | Release (g/25 mm) | Readhesion (g/25 mm) |
| Control-1 | 430 | 106 | 406 | 73 |
| CE-13 | 150 | 139 | 154 | 120 |
| EX-17 | 75 | 138 | 78 | 112 |
| EX-18 | 16 | 142 | 35 | 113 |

As shown in Tables 7A and 7B, some compositions using a nonfunctional fluorosilicone having fluorinated groups containing only one fluorinated carbon (i.e., trifluoropropyl groups) did not perform as well as compositions using a nonfunctional fluorosilicone having fluorinated groups containing two or more fluorinated carbons (e.g., nonafluorohexyl groups). The release compositions of Table 13A were prepared using a functional fluorosilicone with trifluoropropyl groups (i.e., Fn-FSP-B) with a variety of trifluoropropyl and nonafluorohexyl group-containing nonfunctional fluorosilicones.

TABLE 13A

Release compositions using a functional fluorosilicone
with trifluoropropyl groups.

| I.D. | (X) Fn-XF-SP | (Y) Fn-FSP | (Z) NFn-FSP | (Z) fluorinated groups | Composition |
|---|---|---|---|---|---|
| CE-14 | B | B | — | none | 70:30 X:Y |
| EX-19 | A | B | G | nonafluorohexyl | 90:10 X:Y + 8 pph Z |
| EX-20 | A | B | G | nonafluorohexyl | 80:20 X:Y + 8 pph Z |
| EX-21 | B | B | G | nonafluorohexyl | 70:30 X:Y + 12 pph Z |
| EX-22 | B | B | A | nonafluorohexyl | 70:30 X:Y + 12 pph Z |
| EX-23 | B | B | F | trifluoropropyl | 70:30 X:Y + 12 pph Z |
| EX-24 | B | B | C | trifluoropropyl | 70:30 X:Y + 12 pph Z |

As summarized in Table 13B, premium release could be obtained using a functional fluorosilicone polymer with trifluoropropyl groups through appropriate modifications in the compositions. However, in this example, higher levels of the functional fluorosilicone were required to achieve premium release. As before, the use of a nonfunctional fluorosilicone with only one fluorinated carbon atom did not produce premium release, while the use of nonfunctional fluorosilicones with two or more fluorinated carbon atoms (e.g., nonafluorohexyl groups) yielded premium release in similar compositions. Thus, in some embodiments, it may be desirable to use functional, fluorosilicone polymers having fluorinated groups containing at least two fluorinated carbon atoms, e.g., at least four fluorinated carbon atoms.

TABLE 13B

Release and readhesion results

| | 3 days at 50° C. | 14 days at 50° C. | |
|---|---|---|---|
| I.D. | Release (g/25 mm) | Release (g/25 mm) | Readhesion (g/25 mm) |
| CE-14 | 566 | 793 | 461 |
| EX-19 | N/T | 685 | 395 |
| EX-20 | N/T | 280 | 366 |
| EX-21 | 130 | 301 | 416 |
| EX-22 | 30 | 57 | 572 |
| EX-23 | 645 | 822 | 493 |
| EX-24 | 496 | 638 | 490 |

Release compositions prepared with nonfunctional fluorosilicone polymers having at least four fully fluorinated carbon atoms. These compositions are summarized in Table 14A.

TABLE 14A

Release compositions.

| I.D. | (X) Fn-XF-SP | (Y) Fn-FSP | (Z) NFn-FSP | (Z) fluorinated groups | Composition |
|---|---|---|---|---|---|
| CE-15 | B | C | — | none | 90:10 X:Y |
| EX-25 | B | C | G | nonafluoro-hexyl | 90:10 X:Y + 12 pph Z |
| EX-26 | B | C | B | C3H6—O—C4F9 | 90:10 X:Y + 12 pph Z |

Release and readhesion results using adhesive ADH-1 laminated to the release materials are summarized in Table 14B. Results obtained with Control-1 are included for comparison. The data shows that incorporation of nonfunctional fluoropolymers having fluorinated groups containing more than one fluorinated carbon results in lower release forces.

TABLE 14B

Release and readhesion.

| | 3 days at 50° C. | | 14 days at 50° C. | |
|---|---|---|---|---|
| I.D. | Release (g/25 mm) | Readhesion (g/25 mm) | Release (g/25 mm) | Readhesion (g/25 mm) |
| Control-1 | 43 | 499 | 39 | 483 |
| CE-15 | 212 | 530 | 217 | 529 |
| EX-25 | 43 | 484 | 21 | 479 |
| EX-26 | 22 | 395 | 21 | 401 |

Release compositions prepared from other fluorosilicone polymers having at least four fully fluorinated carbon atoms. These compositions are summarized in Table 15A. CE-16 and CE-27 were prepared as 15 weight percent solutions in a 20:80 blend of heptane and ethyl acetate, CE-17 was diluted down to a 5 weight percent solution with FS-thinner (available from Shin Etsu) per the manufacture's recommendations while CE-18 and EX-26 were diluted down to 8 weight percent solid solutions in a 20:80 blend of heptane and ethyl acetate to improve solubility.

TABLE 15A

Release compositions.

| I.D. | (X) Fn-XF-SP | (Y) Fn-FSP | (Z) NFn-FSP | (Z) fluorinated groups | Composition |
|---|---|---|---|---|---|
| CE-16 | B | C | — | none | 90:10 X:Y |
| CE-17 | | E | | none | 100 Y |
| CE-18 | B | E | — | none | 90:10 X:Y |
| EX-27 | B | C | G | nonafluoro-hexyl | 90:10 X:Y + 12 pph Z |
| EX-28 | B | E | G | nonafluoro-hexyl | 90:10 X:Y + 12 pph Z |

Release and readhesion results using adhesive ADH-2 laminated to the release materials are summarized in Table 15B. Results obtained with Control-1 are included for comparison. As before, incorporation of functional fluoropolymers having fluorinated groups containing more than one fluorinated carbon results in lower release forces. Also, three-part compositions provided lower release forces than one- and two-part systems.

TABLE 15B

Release and readhesion.

| | Release and readhesion at 30.5 cm/min (g/25 mm) | | | |
|---|---|---|---|---|
| | 3 days at 50° C. | | 14 days at 50° C. | |
| I.D. | Release (g/25 mm) | Readhesion (g/25 mm) | Release (g/25 mm) | Readhesion (g/25 mm) |
| Control-1 | 51 | 177 | 40 | 188 |
| CE-16 | 141 | 135 | 163 | 115 |
| CE-17 | 41 | 149 | 38 | 177 |
| CE-18 | 125 | 125 | 151 | 163 |
| EX-27 | 45 | 143 | 51 | 154 |
| EX-28 | 16 | 135 | 20 | 156 |

Figure 1:
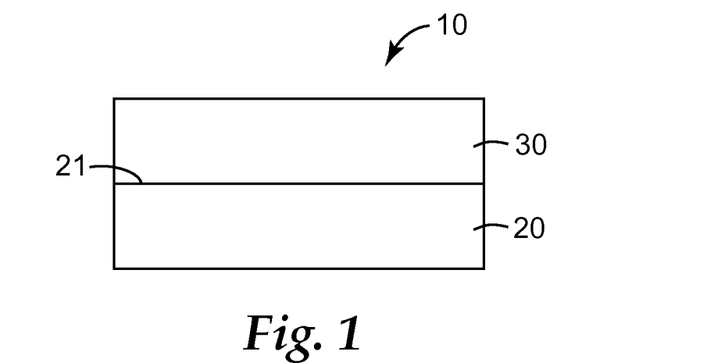
FIG. 1 illustrates a release article according to some embodiments of the present disclosure.

As demonstrated by the examples above and as illustrated in FIG. 1, the blended release compositions of the present disclosure may be used as the release layer of a release liner. Referring to FIG. 1, release liner 10 comprises substrate 20 and release layer 30, bonded to first major surface 21 of substrate 20. In some embodiments, the release layer is directly bonded to the substrate. In some embodiments, the release layer may be indirectly bonded to the substrate, e.g., one or more intervening layers (e.g., primer layers) may be interposed between the release layer and the substrate. Generally, any substrate may be used including, e.g., paper, glassine, polymeric films, polycoated papers, and the like.

The release compositions of the present disclosure may also be suitable for use in a wide variety of adhesive articles. For example, in some embodiments, a supported or unsupported adhesive layer may be in contact with the release layer. The release layer may be bonded to a substrate (i.e., the release composition may be the release layer on a release liner). In some embodiments, the adhesive may be bonded, directly or indirectly, to a backing.

Rhe adhesive can be a silicone adhesive. Exemplary silicone adhesives include e-beam cured silicone adhesives, such as those described in U.S. Pat. No. 8,541,181 (Bresnick), as well as silicone polyurea adhesives, such as those described in U.S. Pat. No. 7,078,093 (Sheridan), and polydiorganosiloxane-polyoxamide adhesives such as those described in WO 2011/082069 (Hays).

Figure 2:
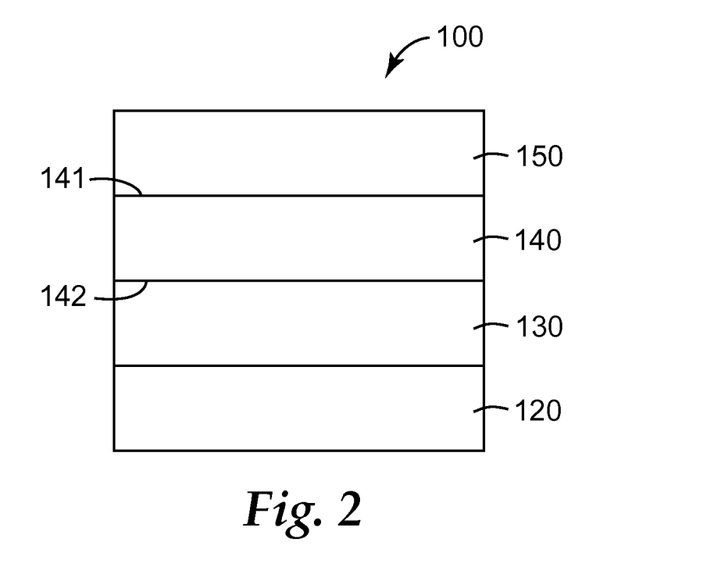
FIG. 2 illustrates an adhesive article according to some embodiments of the present disclosure.

For example, referring to FIG. 2, exemplary adhesive article 100 according to some embodiments of the present disclosure comprises backing 150. Generally, any known backing may be used including those comprising one or more layers of paper, polymer films, metallic foils, foam, and the like. First major surface 141 of adhesive 140 is bonded to backing 150. Opposite second major surface 142 or adhesive 140 is in contact with the release layer 130, which itself is bonded to substrate 120. In the foregoing description, a layer may be bonded directly or indirectly to its adjacent layer(s).

In some embodiments, the adhesive article may not include a release liner. For example, in some embodiments, the release material may be bonded to one major surface of a backing with the adhesive bonded to the opposite major surface. The adhesive may then be self-wound or stacked such that the adhesive of one layer contacts the release material of the underlying layer. In some embodiments, the adhesive article may not include a backing associated with the adhesive. For example, in some embodiments, such as transfer tapes, an adhesive may be in contact with the one release liner or between two release liners.

Various modifications and alterations of this invention will become apparent to those skilled in the art without departing from the scope and spirit of this invention.

What is claimed is:

1. A composition comprising a blend of:
   (a) a functional, non-fluorinated, silicone polymer comprising at least two ethylenically unsaturated organic groups;
   (b) a functional fluorosilicone polymer; and
   (c) a nonfunctional fluorosilicone polymer, wherein the nonfunctional fluorosilicone polymer comprises one or more fluorinated groups having two or more fluorinated carbon atoms, wherein the fluorinated groups of the nonfunctional fluorosilicone polymer comprise fluorinated ether groups.

2. The composition of claim 1, wherein the blend comprises at least 50 weight percent of the functional, non-fluorinated, silicone polymer based on the total weight of (a) and (b).

3. The composition of claim 1, wherein the blend comprises at least 3 weight percent of the functional fluorosilicone polymer based on the total weight of (a) and (b).

4. The composition of claim 1, wherein the blend comprises at least 1 part by weight of the nonfunctional fluorosilicone polymer per 100 parts by weight of (a) and (b).

5. The composition of claim 1, wherein
   the functional fluorosilicone polymer comprises at least two ethylenically-unsaturated organic groups; and
   the ratio of the vinyl equivalent weight of the functional fluorosilicone polymer over the vinyl equivalent weight of the functional non-fluorinated silicone polymer is at least 1.

6. The composition of claim 5, wherein the ratio of the vinyl equivalent weight of the functional fluorosilicone polymer to the vinyl equivalent weight of the functional non-fluorinated silicone polymer is from 2 to 20.

7. The composition according to claim 1, wherein the functional fluorosilicone polymer comprises fluorinated groups comprising two or more fluorinated carbon atoms.

8. The composition according to claim 1, further comprising at least one of a silicone crosslinker and a fluorosilicone crosslinker.

9. The composition according to claim 8, wherein at least one crosslinker comprises a silicon bonded hydride group.

10. A cured release material comprising the composition according to claim 1, wherein the functional, non-fluorinated, silicone polymer and the functional fluorosilicone polymer are crosslinked.

11. A composition comprising a blend of:
    (a) at least 80 to no greater than 95 weight percent based on the total weight of (a) and (b) of a functional, non-fluorinated, silicone polymer comprising at least two ethylenically-unsaturated groups;
    (b) at least 5 to no greater than 20 weight percent based on the total weight of (a) and (b) of a functional fluorosilicone polymer comprising at least two ethylenically-unsaturated groups; and
    (c) at least 1 to no greater than 15 parts by weight of a nonfunctional fluorosilicone polymer based on 100 parts by weight of (a) and (b), wherein the nonfunctional fluorosilicone polymer comprises one or more fluorinated groups having two or more fluorinated carbon atoms, wherein the fluorinated groups of the nonfunctional fluorosilicone polymer comprise fluorinated ether groups.

12. A cured release material comprising the composition according to claim 11 wherein the functional, non-fluorinated, silicone polymer and the functional fluorosilicone polymer are crosslinked.

13. A release liner comprising a substrate and the cured release material according to claim 12 bonded to at least a portion of at least one surface of the substrate.

14. An adhesive article comprising the release liner of claim 13 and a silicone adhesive in contact with at least a portion of at least one surface of the cured release material.

* * * * *

UNITED STATES PATENT AND TRADEMARK OFFICE
CERTIFICATE OF CORRECTION

PATENT NO. : 10,351,730 B2
APPLICATION NO. : 15/100688
DATED : July 16, 2019
INVENTOR(S) : Daniel Carvajal Page 1 of 1

It is certified that error appears in the above-identified patent and that said Letters Patent is hereby corrected as shown below:

On the Title Page

Item (73) Assignee,
Line 1, delete "Innovation" and insert -- Innovative --, therefor.

Page 2, Column 2,
Line 16, delete "TW" and insert -- CN --, therefor.

In the Specification

Column 12,
Line 30, delete "Ton)" and insert -- Torr) --, therefor.

Signed and Sealed this
Third Day of September, 2019

Andrei Iancu
*Director of the United States Patent and Trademark Office*